Sept. 2, 1924.
R. H. ALDRICH
VALVE HOLDING DEVICE
Filed May 16, 1923
1,507,448
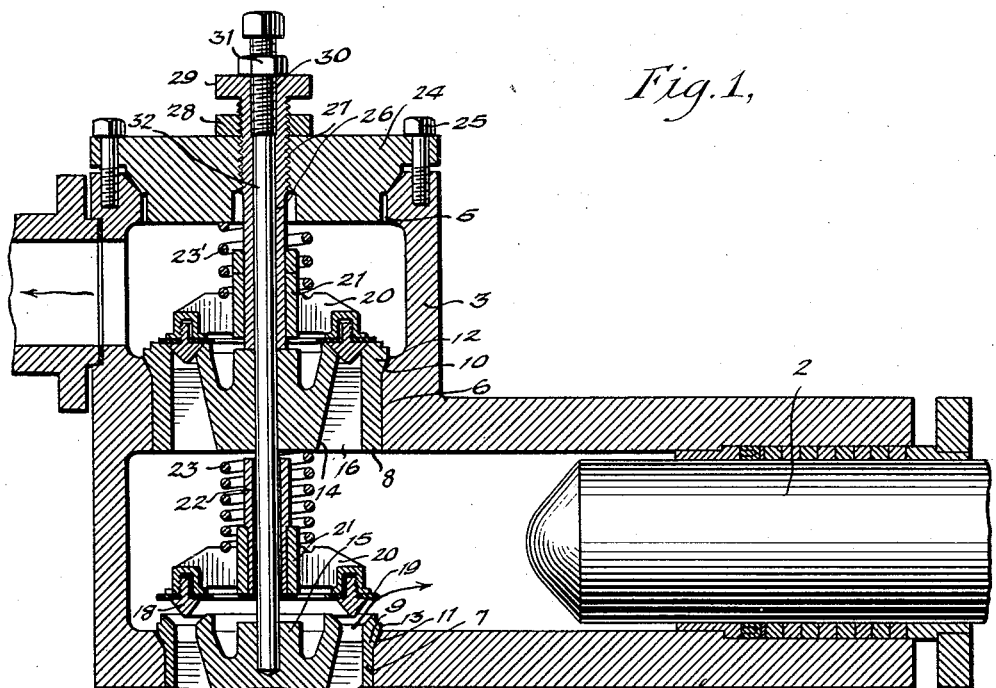
Fig.1,
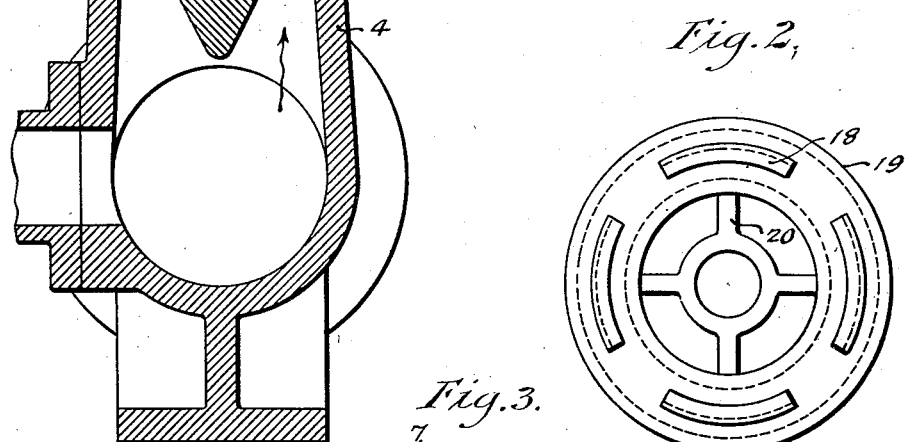
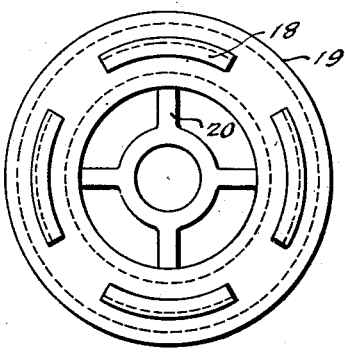
Fig.2,
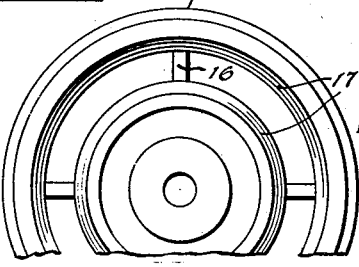
Fig.3.
WITNESSES
Edw. Thorpe
A. L. Kitchin
INVENTOR
Roscoe H. Aldrich
BY
Munn & Co
ATTORNEYS Patented Sept. 2, 1924.

1,507,448

UNITED STATES PATENT OFFICE.

ROSCOE H. ALDRICH, OF ALLENTOWN, PENNSYLVANIA.

VALVE-HOLDING DEVICE.

Application filed May 16, 1923. Serial No. 639,387.

*To all whom it may concern:*

Be it known that I, ROSCOE H. ALDRICH, a citizen of the United States, and a resident of Allentown, in the county of Lehigh and State of Pennsylvania, have invented a new and Improved Valve-Holding Device, of which the following is a full, clear, and exact description.

This invention relates to valves and particularly to an improved holding device therefor and has for an object to provide a construction wherein a plurality of substantially aligned valves may be readily applied and removed.

Another object of the invention is to provide aligned valves for pumps and similar devices wherein the valve seats are held in place by clamping means extending to an exterior point.

In the accompanying drawing,—

Figure 1 is a longitudinal vertical sectional view through a system of valves shown in connection with a pump, said valves and associated parts illustrating an embodiment of the invention.

Figure 2 is a top plan view of one of the valve rings shown in Figure 1.

Figure 3 is a top plan view of one of the valve seats shown in Figure 1, one side being broken away.

Referring to the accompanying drawing by numerals, 1 indicates a pump casing provided with a piston 2 of any desired structure. The pump casing and piston form no part of the present invention but are shown to better illustrate the construction. Associated with the casing 1 is what may be termed a valve casing 3 and an outlet casing 4 into which the lower valve projects. The valve casing 3 may be made integral with the casing 1 or separate as preferred.

In forming the valve casing 1, an entrance opening 5 is provided of a certain size and a valve seat 6 somewhat smaller than the opening 5. In addition, a second valve seat opening 7 is provided in casing 1, said second opening being smaller than opening 6 so that the valve seats 8 and 9 may be readily inserted through the opening 5 and properly positioned in alignment. The valve seats fit snugly in their respective openings but not necessarily tightly. Preferably, the respective openings 6 and 7 are provided with flaring mouths 10 and 11 co-acting with the enlarged bearing surfaces 12 and 13 of the valve seats, said bearing surfaces being arranged at a slightly less angle than the mouths 10 and 11 so that the bearing surfaces will rest on a narrow section or edge whereby a tight fit is produced.

It has been found desirable to make the walls of the flaring mouths 10 and 11 to extend at a forty-five degree angle while the surfaces 12 and 13 extend at a forty-three degree angle, though other angles might be provided without departing from the spirit of the invention. The seats 6 and 7 are provided with central members 14 and 15 connected by suitable bars 16 with the outer part of the valve seats whereby seating surfaces 17 are provided for each of the valve structures. A valve ring 18 in each valve co-acts with the seats 17, said valve rings preferably carrying a flap washer or auxiliary valve ring 19. The valve ring 18 and the washer 19 are both carried by the arms 20, which arms are preferably integrally formed with the respective tubular members 21. In respect to the lower valve, the tubular member 21 is supplied with a sleeve 22 and around the sleeve a spring 23 is fitted, said spring at one end bearing against the central member 14 of the upper valve and the lower part of the spring bearing against the arms 20 so as to force the lower valve to its seat. The upper valve is constructed identically with the lower valve except that the sleeve 22 is omitted and the spring 23' bears at one end against the arms 20 and at the other end against the closure or cap 24 which is firmly held in place by suitable screws 25. Heretofore, threads or other means have been provided for holding the seats 6 and 7 in place but in the present construction, special holding devices are presented.

From Figure 1 it will be seen that a tubular member 26 is threaded into the cap 24 and adapted to press against the central member 14 and seat 6 for forcing said seat into its correct position. The threads 27 of the tubular member 26 are not only threaded into the cap 24 but accommodate a lock nut 28. If desired, an enlarged squared head 29 may be provided on the tubular member whereby it may be screwed down tight. The tubular member is also interiorly threaded adjacent the end carrying the enlargement 29 whereby it is adapted to receive a set screw 30 which is locked in any desired position by a lock nut 31. A rod 32 is loosely fitted into the tubular member 26 and extends downwardly through the central member 14 and into the central member 15 so that when the set screw 30 is tightened, it pushes the rod 32 downwardly and causes the same to force the valve seat 7 firmly into its correct position. In this way, both valve seats are held properly in position by means extending to the exterior of the valve casing. Also by this construction and arrangement, whenever the screws 25 are removed, the valves may be readily moved out of their respective casings for renewal, repair or for any other desired purpose.

The valves and the holding means therefor, have been shown in respect to a force pump which naturally draws any liquid through the lower valve and then forces the same out through the upper valve so that these valves operate alternately. It will, however, be evident that the construction could be used in connection with other devices and in other places.

What I claim is:—

1. In a valve structure, a casing provided with seat openings arranged in line, a valve seat for each opening, a valve member for each seat, a holding rod acting to force one of said seats into its opening, an independently acting tubular rod for forcing the other seat into its opening, and means for holding said rods in operative position.

2. In a valve structure, a casing provided with openings for a plurality of valves, a seat fitted in each of said openings, a rod engaging each seat for holding the same in their respective openings, said rods being nested, and a plurality of locking members for locking said rods in operative position.

3. In a valve structure of the character described, a casing provided with a plurality of openings for receiving valves, a valve seat fitted in each of said openings, a tubular rod for pressing against one of said seats, a cap threaded onto said tubular rod for holding the same in place, a second rod loosely fitted into the tubular rod and resting against the second valve seat, and a threaded member acting on the first mentioned rod for pressing the second mentioned rod against its seat for locking the last mentioned seat in position.

4. In a valve structure, a plurality of valve openings having flaring mouths, a valve for each of said openings, each of said valves having a valve seat formed with a tubular portion fitting into said opening and an annular seating portion having an inclination different from that of said flared opening so as to provide a ring or line contact, a rod engaging each of said valve seats, one of said rods extending through the other, and means for forcing said rods against said seats so that the seats will be pressed against the walls of said flaring mouths.

5. In a valve structure of the character described, a casing provided with a pair of aligned valve openings, a valve for each opening, each of said valves being provided with a valve seat, each of said openings being formed with a flaring mouth and each of said seats being formed with a tapering bearing portion, the walls of which have a different inclination from that of the mouths so that an edge contact will be provided, a rod engaging each of said valve seats, said rods extending to the exterior of the casing, and means acting on said rods for causing the same to press the valve seats into their correct position.

6. In a valve structure of the character described, a casing provided with a pair of aligned valve openings, a valve for each of said openings, each of said valves being provided with a valve seat, each of said openings being formed with a flaring mouth having a certain inclination and each of said valve seats being formed with a tapering portion having a different inclination whereby there is presented a contact edge for each seat, a rod mounted on one of said seats and extending through the other seat, a tubular rod surrounding part of the first mentioned rod and bearing against the second seat, a cap connected with said casing formed with a threaded portion, said tubular rod being formed with a threaded section engaging the threaded portion of said cap whereby said tubular rod may be acted on to press one of said seats into operative position, said tubular rod having an interior threaded section, and a set screw threaded into said interior threaded section, said set screw acting on the first mentioned rod for pressing the same against one of said seats for causing the same to be held firmly in position.

ROSCOE H. ALDRICH.